Figure 1:
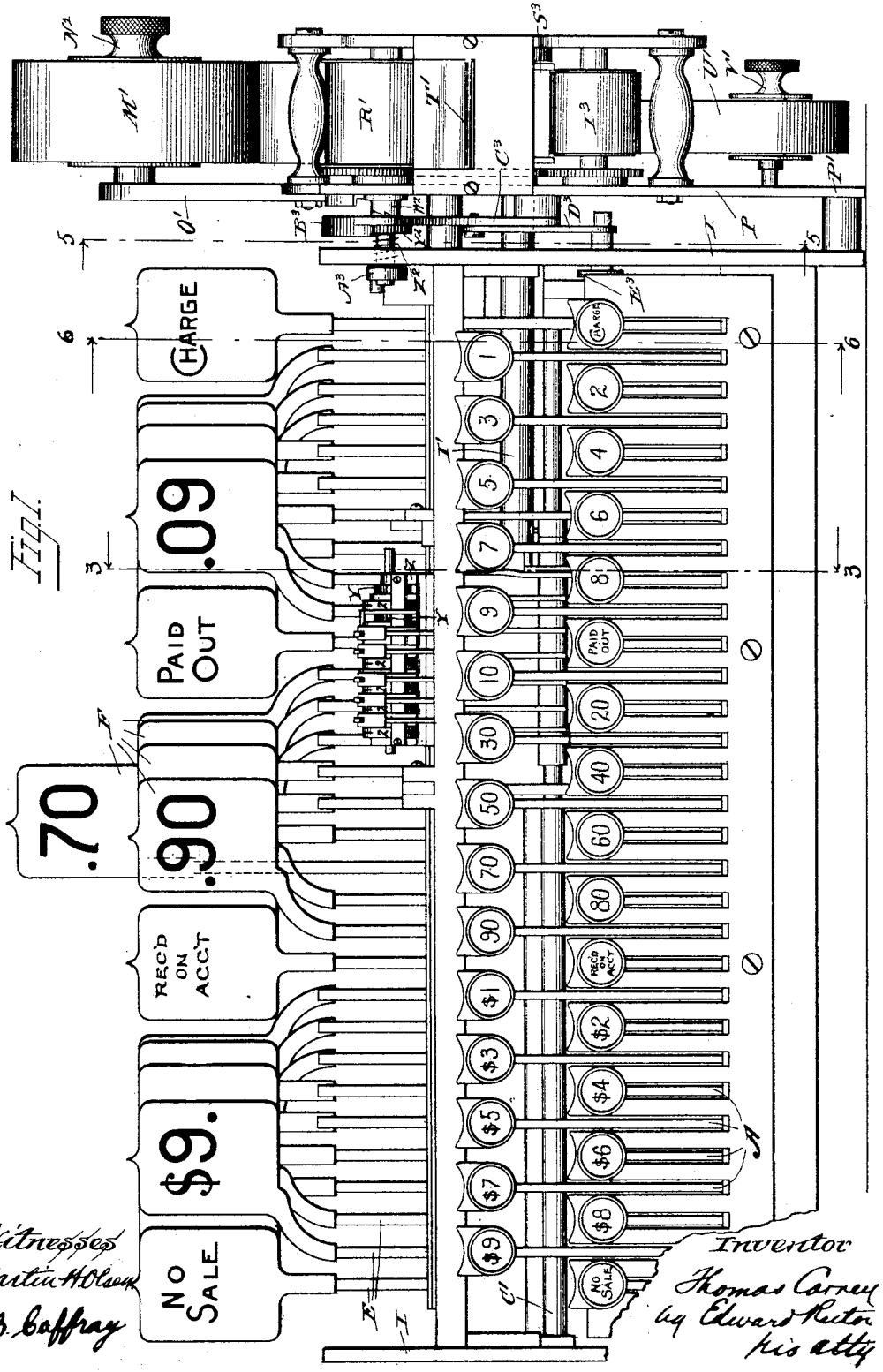

(No Model.) 9 Sheets—Sheet 1.

T. CARNEY.
CASH REGISTER, INDICATOR, RECORDER, AND CHECK PRINTER.

No. 536,015. Patented Mar. 19, 1895.

Witnesses
Martin H. Olsen
R. B. Caffray

Inventor
Thomas Carney
by Edward Rector
his atty

THE NORRIS PETERS CO., PHOTO-LITHO., WASHINGTON, D. C.

(No Model.) 9 Sheets—Sheet 4.
T. CARNEY.
CASH REGISTER, INDICATOR, RECORDER, AND CHECK PRINTER.
No. 536,015. Patented Mar. 19, 1895.

Witnesses
Martin H. Olsen
R. B. Caffray

Inventor
Thomas Carney
by Edward Rector
his atty

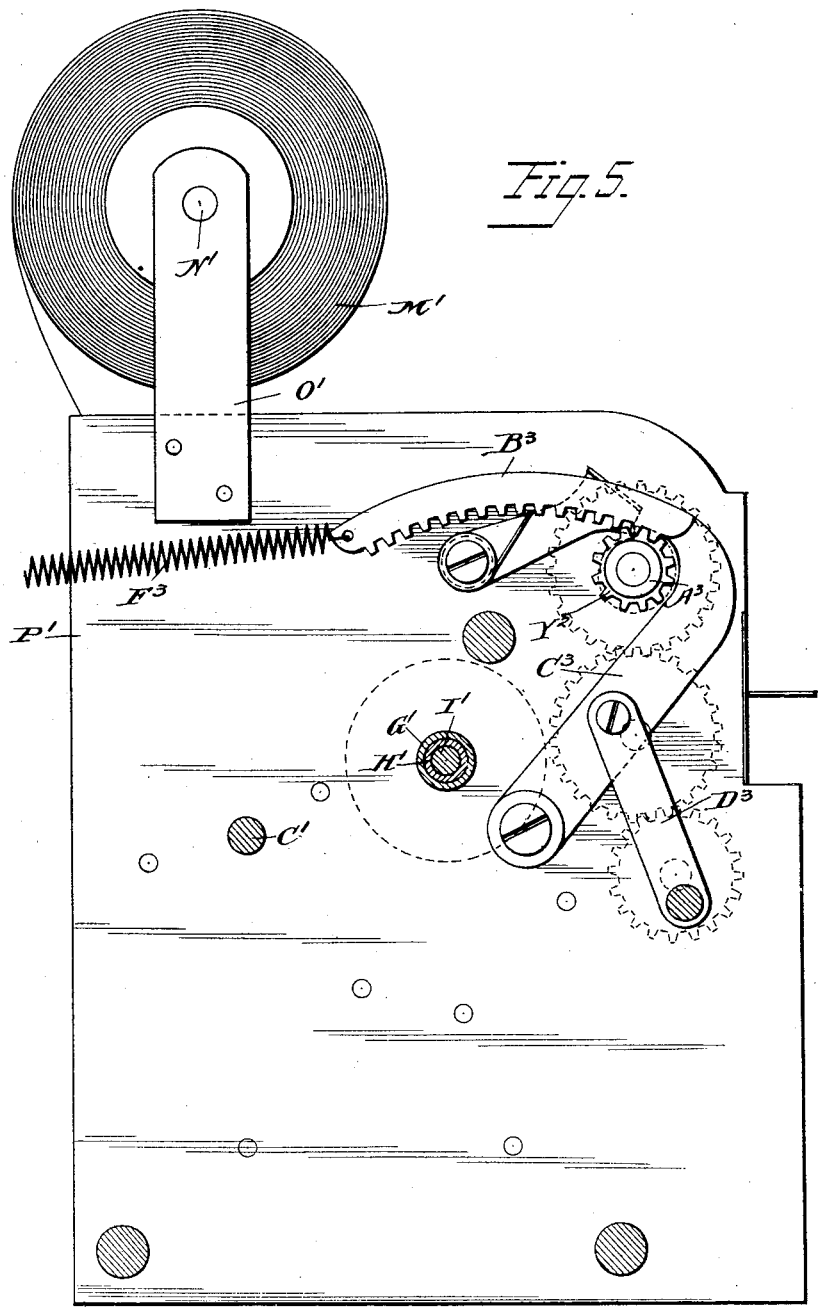

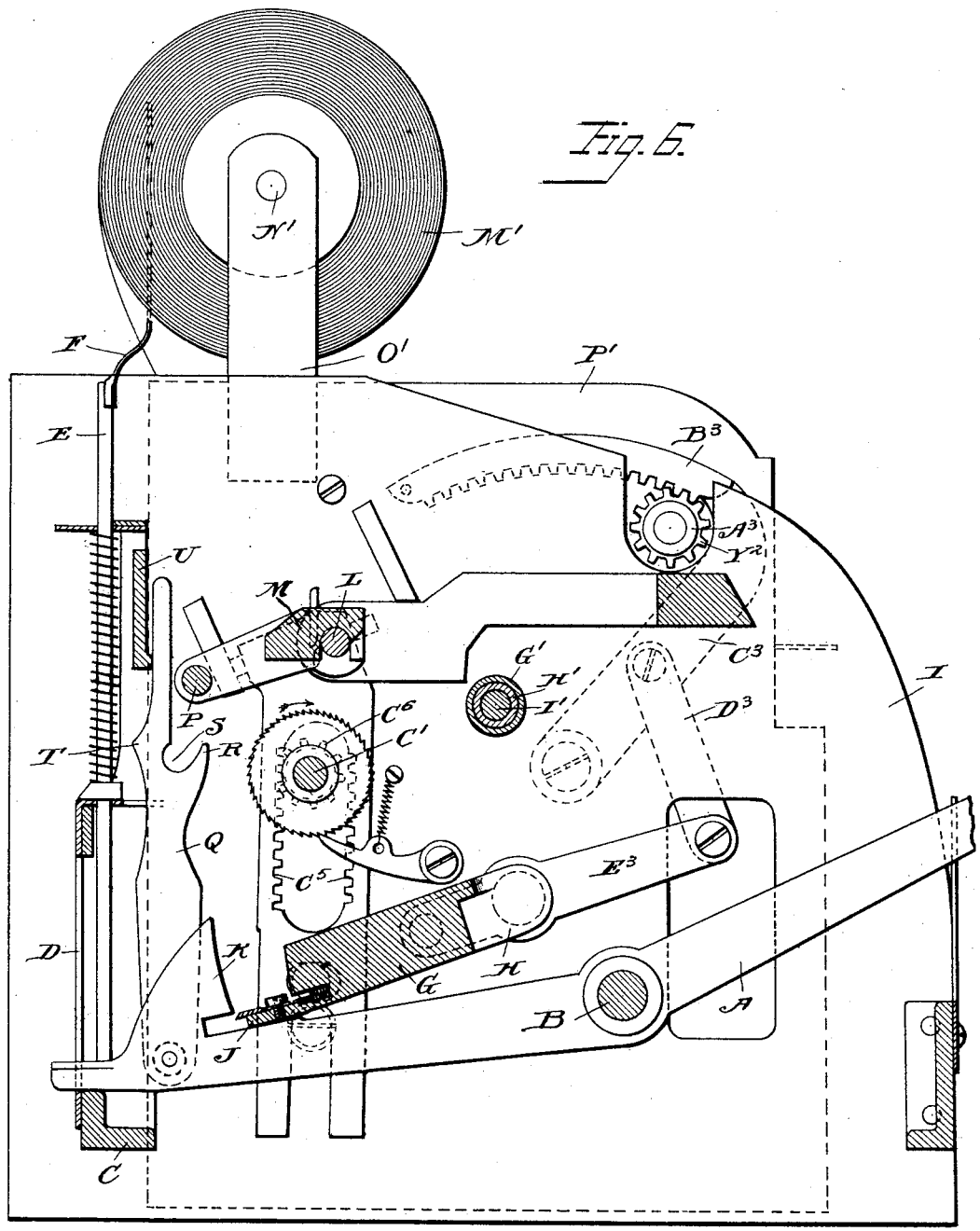

(No Model.) 9 Sheets—Sheet 7.
T. CARNEY.
CASH REGISTER, INDICATOR, RECORDER, AND CHECK PRINTER.
No. 536,015. Patented Mar. 19, 1895.
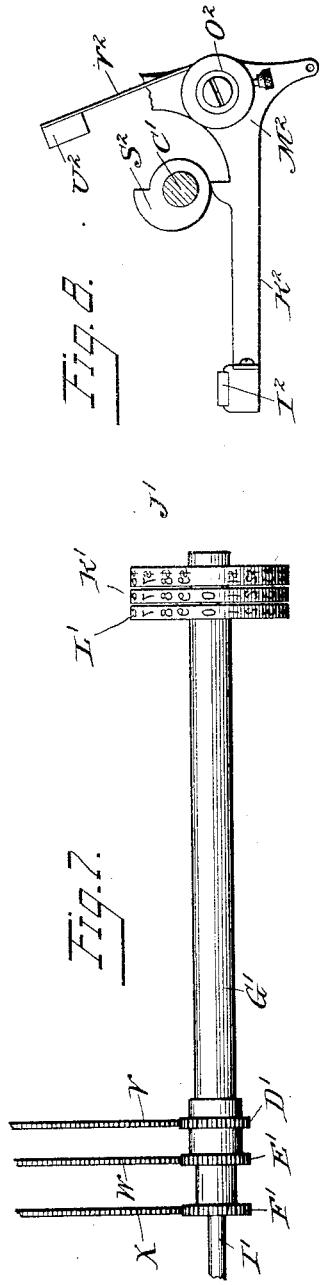

(No Model.) 9 Sheets—Sheet 8.

T. CARNEY.
CASH REGISTER, INDICATOR, RECORDER, AND CHECK PRINTER.

No. 536,015. Patented Mar. 19, 1895.

Witnesses
Martin H. Olsen.
R. B. Caffray

Inventor
Thomas Carney
by Edward Rector
his atty (No Model.) 9 Sheets—Sheet 9.
T. CARNEY.
CASH REGISTER, INDICATOR, RECORDER, AND CHECK PRINTER.
No. 536,015. Patented Mar. 19, 1895.
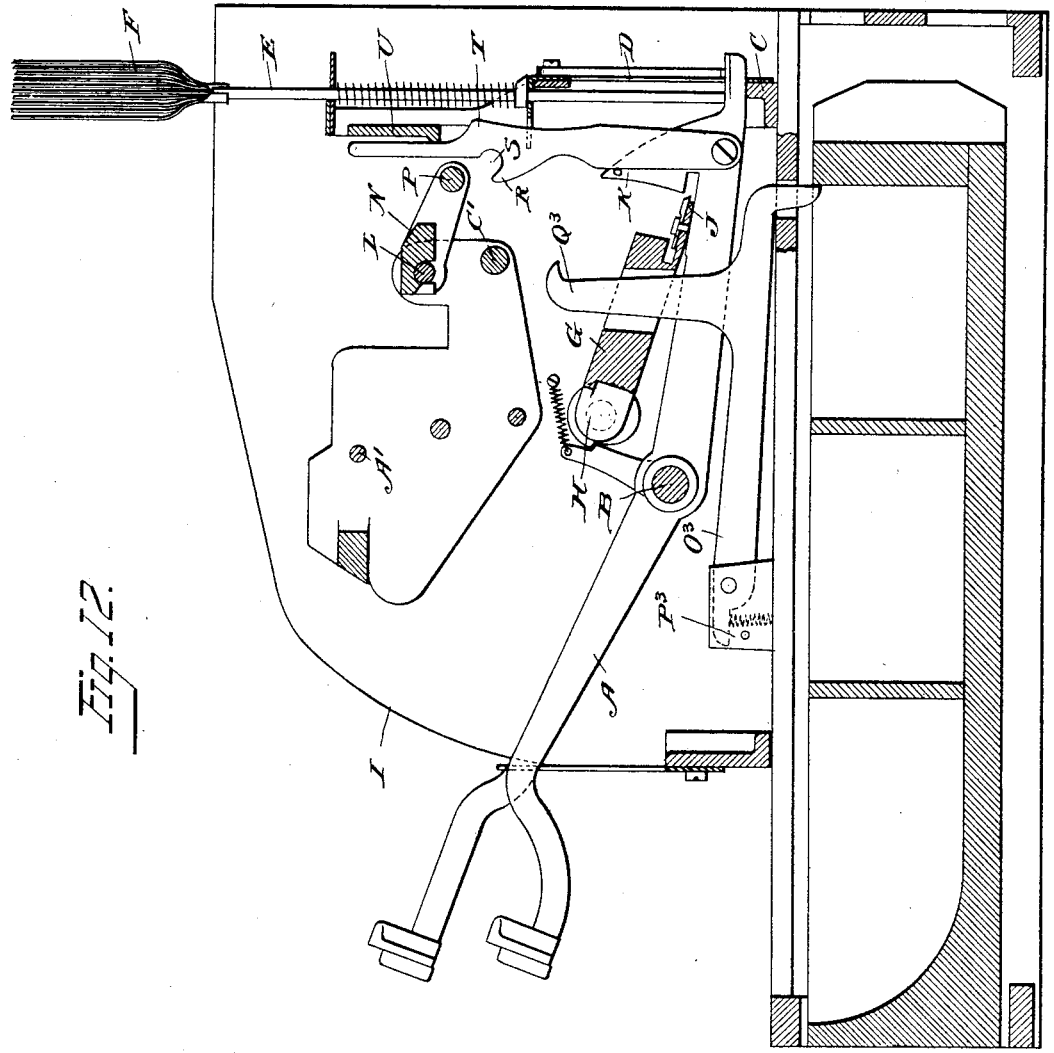

UNITED STATES PATENT OFFICE.

THOMAS CARNEY, OF DAYTON, OHIO, ASSIGNOR TO THE NATIONAL CASH REGISTER COMPANY, OF SAME PLACE.

CASH REGISTER, INDICATOR, RECORDER, AND CHECK-PRINTER.

SPECIFICATION forming part of Letters Patent No. 536,015, dated March 19, 1895.

Application filed June 18, 1894. Serial No. 514,939. (No model.)

*To all whom it may concern:*

Be it known that I, THOMAS CARNEY, a citizen of the United States, residing at Dayton, in the county of Montgomery and State of Ohio, have invented a certain new and useful Improvement in Cash-Registers and Check-Printers, of which the following is a description, reference being had to the accompanying drawings, forming part of this specification.

I have illustrated and will describe my invention as applied to a machine substantially the same as that patented to me by Letters Patent No. 497,861, dated May 23, 1893, but in its principal feature my invention is in no way restricted to such machine and may be utilized in machines of widely differing constructions.

In the machine patented to me as aforesaid there were employed a series of operating keys representing different amounts in connection with a printing mechanism by which whenever any key was operated its value would be printed upon a paper strip, which strip by the operation of an independent device could then be advanced and the printed check be severed from it.

In my present machine the means for advancing the paper strip after it has been printed is combined with the operating keys and the printing mechanism, so that the strip is automatically advanced after the printing has been effected and brought into position for the printed check to be torn off by hand against a suitable knife or tearing edge; and in this combination of the operating keys with the printing and feeding mechanisms for the paper strip, by which the latter is printed and then automatically advanced to position for the check to be torn off, by the simple operation of any one of the keys, the principal feature of my invention consists.

In my present machine, as in my former one, the printing mechanism also operates upon a paper-record-strip carried within the machine, and the feed-rollers for advancing the check-strip consist of a printing and an impression roller by which the checks may be numbered and dated and suitable advertisements or other memoranda automatically printed upon the check as it is delivered from the machine; but neither of these features is essential to the main idea of my invention, which, as before stated consists in the broad combination of a series of operating keys representing different amounts and printing and feeding mechanisms actuated in succession thereby to print the values of the operated keys upon the paper strip and then advance the latter to position for the printed check to be torn off.

Figure 2:
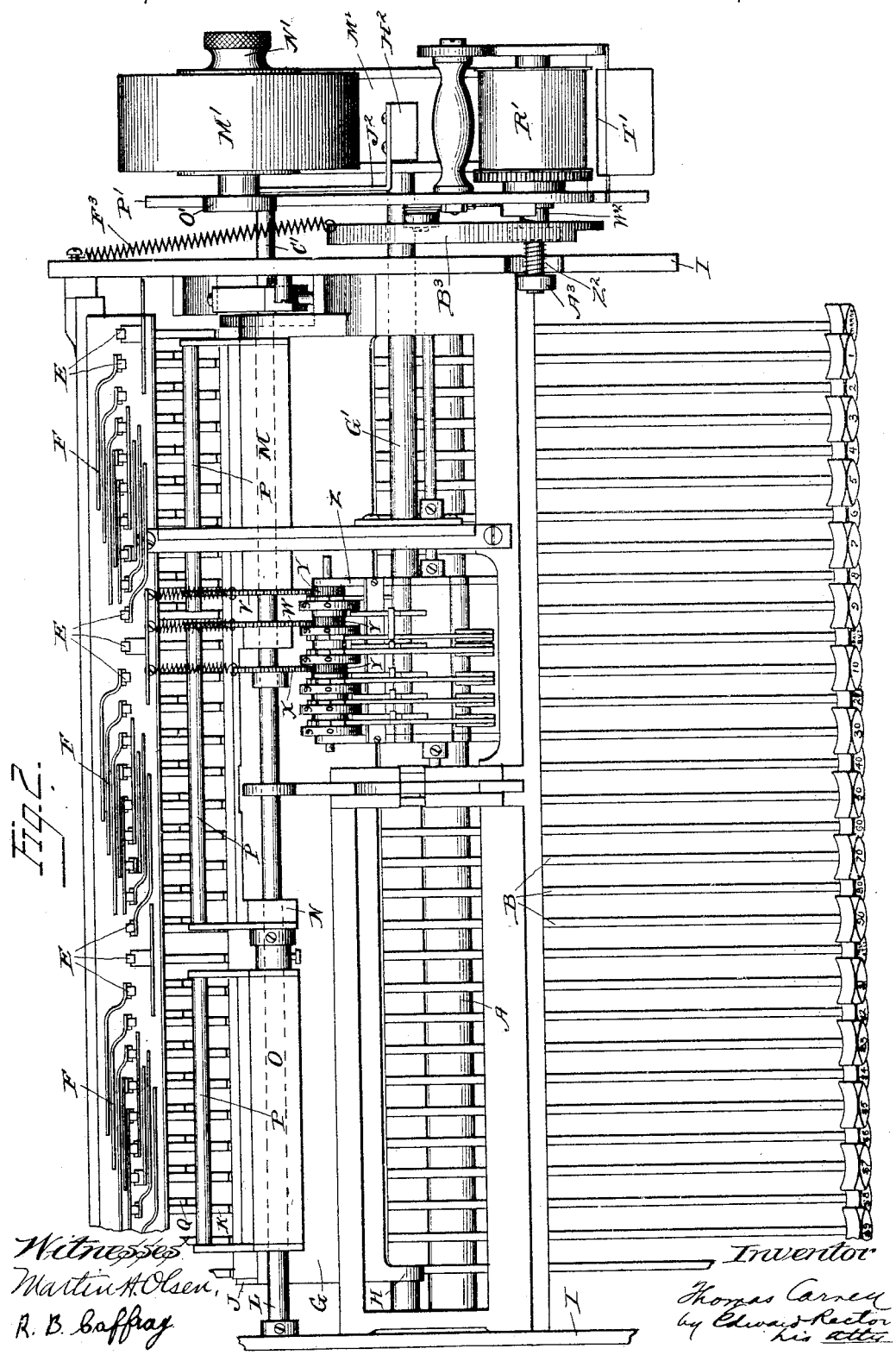
Figure 3:
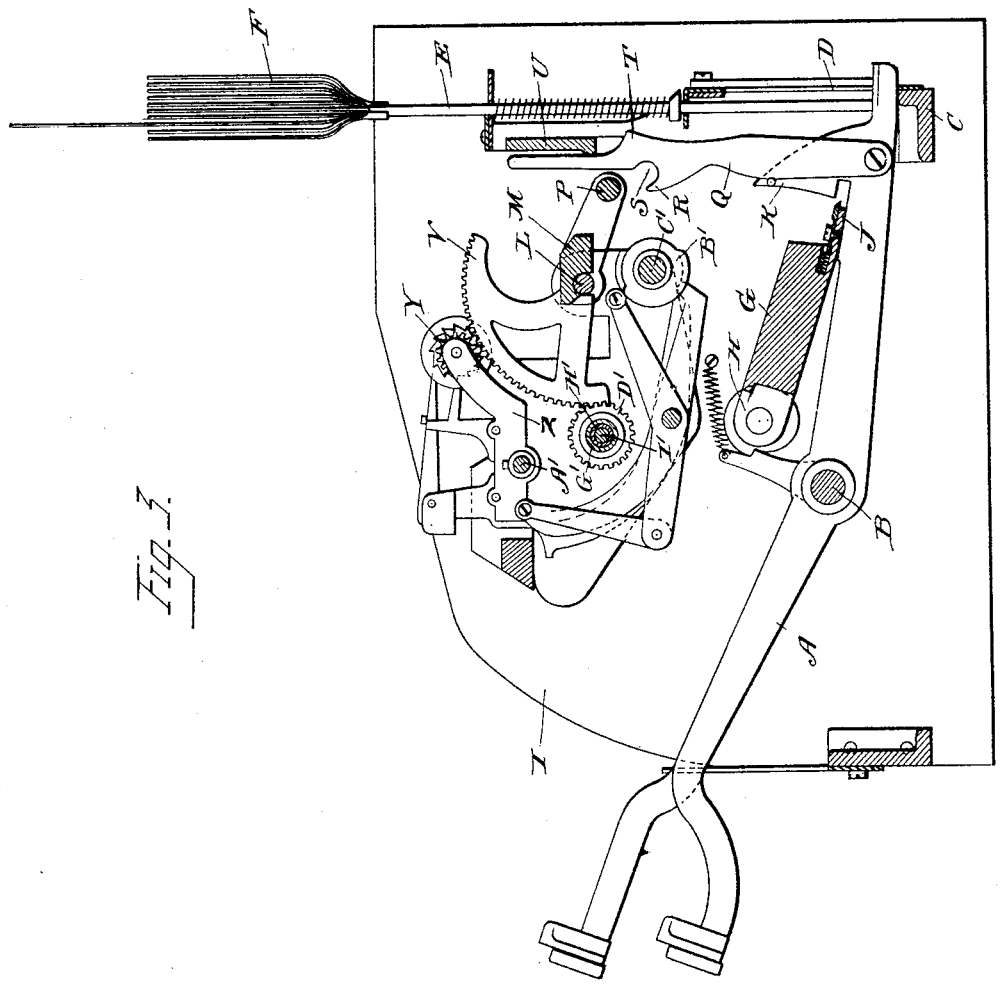
Figure 4:
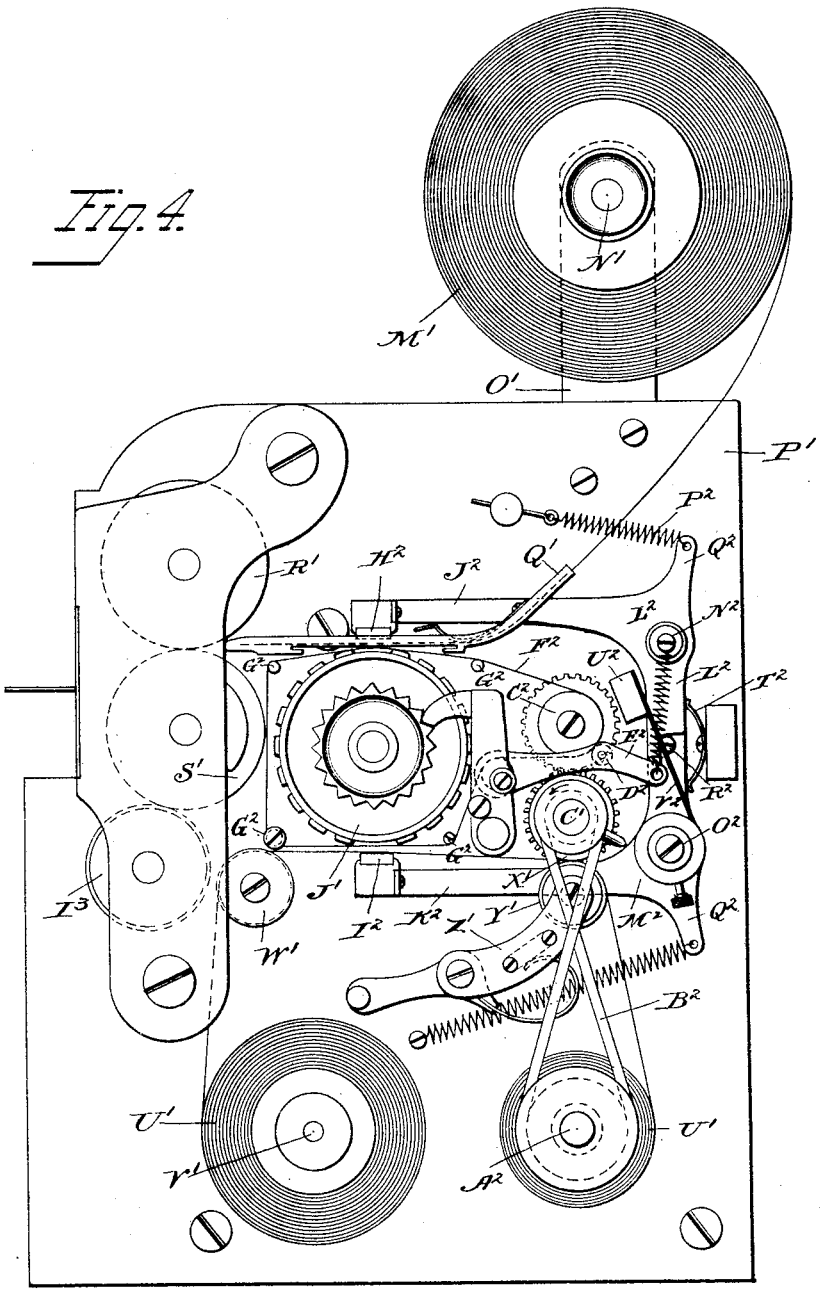
Figure 11:
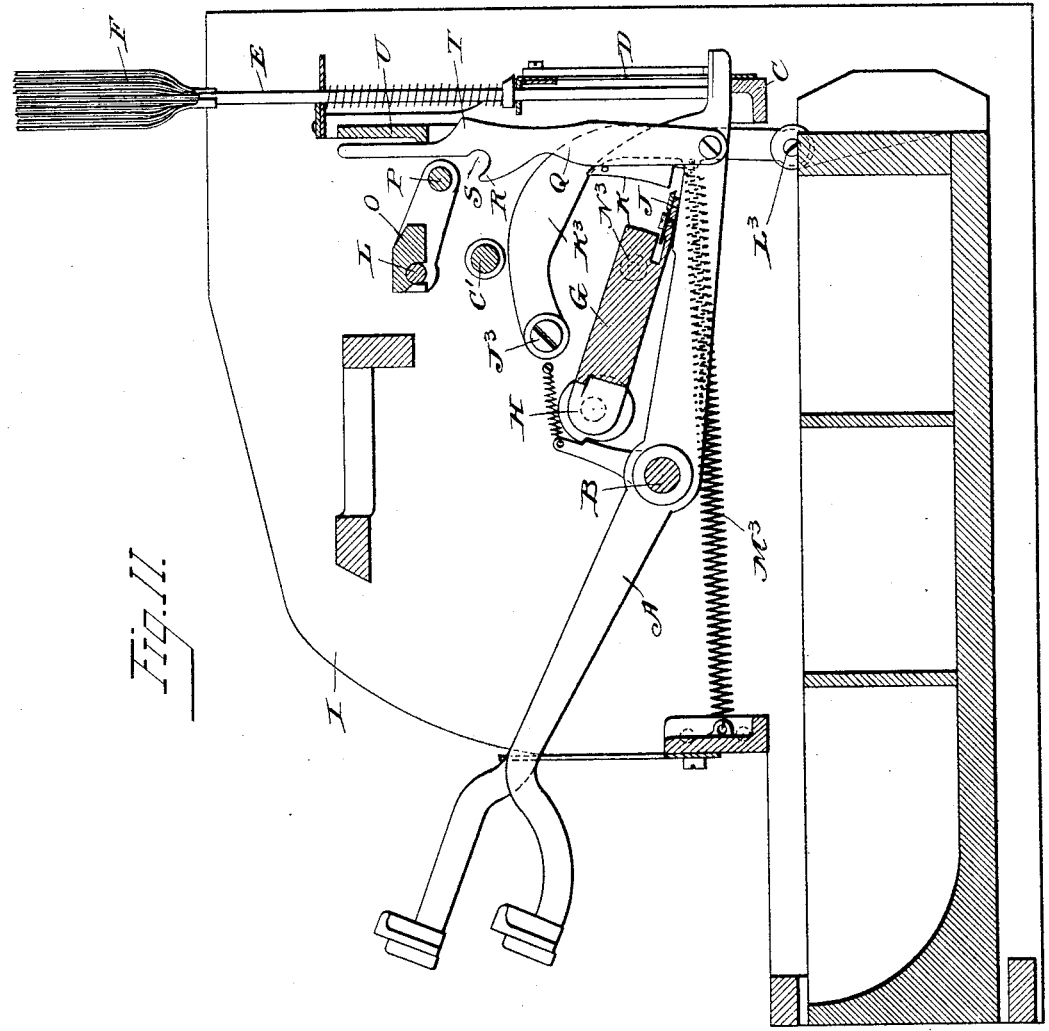

In the accompanying drawings Figure 1 is a front elevation of the machine removed from its casing; Fig. 2, a top plan view of the same; Fig. 3, a vertical section approximately on the line 3—3 of Fig. 1; Fig. 4, an enlarged elevation of the right side of the printing attachment; Fig. 5, an enlarged vertical section between the right hand side frame of the machine and the printing attachment, approximately on the line 5—5 of Fig. 1; Fig. 6, an enlarged vertical section of the upper portion of the machine approximately on the line 6—6 of Fig. 1; Fig. 7, a detail view of the type-wheels, the sleeves and shaft upon which they are mounted, and the segments geared to said sleeves and shaft; Fig. 8, a detail view of one of the printing hammers and the cam for actuating it; Fig. 9, a detail view of one of the printed checks; Fig. 10, a detail front elevation of the impression-roller, type-cylinder and inking roller; Fig. 11, a vertical cross-section of the machine near the left hand side thereof and looking toward the left, showing the resetting spring for the vibrating frame and the parts for putting it under tension by the closing of the money-drawer; and Fig. 12, a middle vertical section showing the money-drawer, its latch and the means for operating the latter.

The same letters of reference are used to indicate identical parts in all the figures.

Under the arrangement shown in the drawings the operating keys are divided into three sets, each representing multiples of one from 1 to 9 inclusive, the set on the right indicating units of cents, that in the middle tens of cents and that on the left units of dollars. In addition to these cash keys there are four special keys, one at each side of the machine and the other two separating the two sets of cash keys. These special keys will not be further referred to. The regular operating or cash keys consist of levers A fulcrumed on a horizontal rod B, Fig. 3, resting at their rear ends upon a cross-piece C of the framework in the lower ends of vertical slots in the guide-plate D, while their forward ends project through the front plate of the casing and carry the usual numbered finger-pieces. The indicators F are carried upon the upper ends of vertically guided rods E resting at their lower ends upon the rear ends of the key-levers, as usual. Overlying the key-levers between their fulcrum and rear ends is the vibrating frame composed of the cross-bar G and the side-arms H by which it is hung to the side-frames I of the machine. The bar G is provided along the lower edge of its rear side with a flange J resting upon the upper sides of the key-levers and co-operating with the slotted lugs or hooks K upon the latter in the usual well-known manner to couple the operated keys to the vibrating frame.

Mounted upon a rock-shaft L extending transversely across the machine in its upper rear portion and journaled at its opposite ends in bearings upon the side-frames I I are three registering frames M N O, each composed of a front cross-bar, two side-arms and a rod P connecting the rear ends of said arms. The right hand and middle frames M N are loose upon the shaft L, while the left hand frame O is fast upon it. One of these registering frames is appropriated to each set of nine keys, and the different keys of each set impart different degrees of movement to their frame by means of a series of graduated lifters Q, Figs. 3, 6 and 12, pivoted at their lower ends to the sides of the key-levers and provided with lifting fingers R and notches S co-operating with the rod P. These fingers and notches upon the different keys are located at different distances from the rod P with which they co-operate, so that they will engage said rod at different points in the movements of the keys and transmit different degrees of movement to the registering frame, as explained in my prior patent. The rear sides of the lifters Q are provided with shoulders T which co-operate with the lower edge of a fixed cross-bar U of the framework to throw the operated lifter forward at the moment its finger R engages the rod P and thereby cause the notch S in the lifter to fully embrace the rod P of the registering frame and securely connect the key and lifter to it. The shoulders T are arranged in different positions upon the lifters, corresponding to the positions of the fingers R and notches S. In this manner the operation of a key-lever in any set is caused to move the corresponding registering frame a distance proportionate to the value of such key.

Fast upon the adjacent ends of the frames M N and upon the shaft L adjacent thereto are three gear-toothed segments V W X which are adapted to co-operate respectively with pinions Y on the first, second and third wheels of a train of registering wheels mounted in a movable frame Z, Figs. 1, 2 and 3, fulcrumed on a rod A' fixed in the frame-work. By means of cams B' fast upon a rotary shaft C', and links and levers intermediate said cams and the front end of the frame Z, the latter is vibrated slightly back and forth at each operation of the machine to throw the pinions Y into and out of mesh with the segments upon the registering frames, as described in detail in my aforesaid prior patent, the adjustment of the parts being such that at the first downward movement of any one of the key levers the frame Z will be rocked and the pinions of the registering wheels thrown into mesh with the segments, while at the beginning of the return stroke of the key the frame Z will be thrown back to initial position and the pinions disengaged from the segments, leaving the latter free to return without turning the wheels. The segments V W X also mesh with pinions D' E' F', the former two fast upon the left hand ends of sleeves G' H' loose upon a shaft I' journaled in bearings in the framework, Figs. 3 and 7, and the latter fast upon said shaft I'. These sleeves and the shaft extend through the right hand side frame I of the machine and carry upon their extreme ends three type-wheels J' K' L', the wheel J' being fast upon the shaft I', the wheel K' upon the sleeve H' and the wheel L' upon the sleeve G'. Each of the type-wheels K' L' is provided with two series of type numbers representing the nine digits, and interposed ciphers, while the wheel J' has two similar series of numbers, with a dollar-mark beside each number and blank spaces between the two series. These two sets of numbers are adapted to operate at two printing points, in this instance at the diametrically opposite upper and lower sides of the wheels, to print the same numbers upon a paper strip led across the top of the wheels and a second one led beneath them. The adjustment of the parts is such that whenever any one of the key levers is given a full positive stroke the type-wheel corresponding to the set of keys containing the operated one will be turned until the two numbers representing the value of such key are brought to the two printing points, whereupon the printing will be effected upon the paper strips by two spring-actuated printing hammers or platens hereinafter described.

The paper-strip M' which passes above the type-wheels, and which will be hereinafter designated the "check-strip," is carried upon a reel N' supported upon a standard O' upon the main frame-plate P' of the printing attachment, Fig. 4, said frame-plate P' being secured to and supported by the right hand side-frame I of the machine, with a slight space between them as seen in Figs. 1 and 2. From the reel N' the check-strip M' is led downward and forward through a guide-chute Q' extending across the type-wheels and provided with an opening immediately over the same to permit the upper printing hammer to strike the strip and carry it against the type-wheels to effect the printing. From the front end of the chute Q' the check-strip passes between a pair of feed-rollers R' S', hereinafter more particularly referred to, and thence onward beneath a fixed knife or tearing edge T' and out of the machine.

The paper strip U' which passes beneath the type-wheels, and which will be hereinafter designated the "record-strip," is carried upon a reel V', led thence upward over a guide-roller W', thence rearward beneath the type-wheels, and between a pair of feeding rollers X' Y', the latter being mounted in a pivoted frame Z' and spring-pressed against the roller X', and thence downward around a storage-reel $A^2$. The roller X' is fast upon the extreme right hand end of the rotary shaft C' heretofore referred to, Fig. 3, which extends at its right hand end through the side-frame I of the machine and on through the frame-plate P' of the printing attachment. This shaft is given a complete rotation at each operation of the machine by means illustrated and described in detail in my prior patent and partly shown in Fig. 6, consisting of two vertically reciprocating rack-bars $C^5$ actuated by the main vibrating frame of the machine and adapted to alternately mesh with a pinion $C^6$ fast upon the shaft C', the rear rack $C^5$ engaging the pinion during the positive stroke of an operated key and upward movement of the vibrating frame, to turn the shaft forward a half revolution, and the forward rack engaging the pinion during the downward stroke of the vibrating frame, to complete the revolution of the shaft. The roller X' has a grooved hub around which passes a yielding band $B^2$ which is crossed and extends downward around the grooved disk or hub of the reel $A^2$. By this means at each operation of the machine the complete revolution of the roller X' advances the record-strip a given distance and the reel $A^2$ is turned to wind up the portion thus advanced. The roller X' is geared to a roller $C^2$ mounted above it and having bearing against it a small roller $D^2$ carried by a spring-pressed arm $E^2$. The endless inking ribbon $F^2$ passing around the type-wheels over suitable guides $G^2$ is led between the rollers $C^2$ $D^2$ and thus advanced at each operation by the turning of the roller $C^2$.

The printing hammers or platens $H^2$ $I^2$ which co-operate respectively with the upper and lower sides of the type-wheels are carried by the horizontal arms $J^2$ $K^2$ of bell-cranks $L^2$ $M^2$ mounted upon pivotal supports $N^2$ $O^2$ carried by the frame-plate P'. Springs $P^2$ connected to short arms $Q^2$ projecting from the bell-cranks tend to throw the printing hammers against the type wheels. The vertical arm of the lower bell-crank is provided near its upper end with a pin $R^2$ which co-operates with the lower end of the vertical arm of the upper bell-crank $L^2$, so that if the lower bell-crank be vibrated to carry its printing hammer away from the type-wheels the upper bell-crank will be similarly moved to carry its hammer away from them. The bell-cranks are actuated, to retract the hammers against the stress of the springs $P^2$ and then release them and permit the springs to throw them against the type-wheels, by a cam $S^2$, Fig. 8, fast upon the rotary shaft C' (behind the roller X' in Fig. 4). This cam co-operates with a lug upon the upper edge of the horizontal arm of the lower bell-crank $M^2$, and its position is such that during the downward stroke of the operated key and first half of revolution of the shaft C' it will gradually depress said arm of the bell-crank $M^2$, and consequently move both printing hammers away from the type-wheels, and just at the end of the positive stroke of the key, or at the very beginning of its return negative stroke, the cam will clear the lug upon the bell-crank and permit the springs $P^2$ to throw the hammers against the type-wheels and effect the printing. The movement of the bell-cranks under the action of the springs $P^2$ is limited by a spring stop $T^2$ with which the vertical arm of the lower bell-crank contacts. The position of this stop is such that it will normally hold the printing hammers slightly away from the type-wheels, to permit the free movement of the inking ribbon and paper-strips, but its resiliency will permit the hammers to strike the type-wheels when the bell-cranks have been retracted by the cam and released in the manner above described.

The ribbon $F^2$ is inked by an inking pad $U^2$ carried by a spring-arm $V^2$ fast upon the hub of the lower bell-crank $M^2$. When the latter is moved by the cam $S^2$, Fig. 8, the inking pad will be thrown against the ribbon upon the roller $C^2$ and ink the same.

The shaft of the feed-roller R' heretofore referred to extends to the left through the frame-plate P' and has fast upon it one member $W^2$ of a clutch whose second member $X^2$ is fast upon the side of a pinion $Y^2$ loosely mounted upon said shaft, Fig. 10. A spring $Z^2$ coiled around the shaft between said pinion and a collar $A^3$ fast upon the end of the shaft yieldingly holds the clutch-members in engagement. The pinion $Y^2$ meshes with a curved rack $B^3$ carried by an arm $C^3$ pivoted at its lower end to the plate P', Figs. 5 and 6. A link $D^3$ connects the arm $C^3$ with the front end of an arm $E^3$ fast upon the right hand side arm H of the main vibrating frame heretofore described. Whenever the rear side of said frame is lifted by the depression of the front end of a key-lever the front end of the arm $E^3$ will be thrown downward, causing the link $D^3$ to pull the arm $C^3$ and rack $B^3$ forward and turn the pinion $Y^2$. During the movement of the parts in this direction the clutch $X^2$ carried by the pinion will slip idly over the clutch-member $W^2$ fast upon the shaft of the feed-roller R' and the latter will remain stationary. When the operated key is released and the parts allowed to return to normal position (a coiled spring $F^3$ connected to the rear end of the rack $B^3$ aiding such movement) the feed roller $R'$ will be turned with the pinion and the check-strip advanced and the printed check projected in front of the fixed tearing edge $T'$ in position to be grasped and torn off against the same.

As stated at the beginning of the specification the rollers for advancing the check-strip may be simple friction feed-rollers, spring-pressed or geared together, but in the present instance, as in my prior machine, the rollers $R'$ $S'$ consist respectively of an impression-roller and type-cylinder geared together by gears upon their left hand ends. The type-cylinder contains a series of dating wheels $G^3$, Fig. 10, and a set of automatically actuated consecutive-numbering wheels $H^3$, illustrated and described in detail in my aforesaid prior patent, by which the checks are dated and numbered, and also bear upon its periphery electro-types for printing such matter as desired upon the checks, for instance such as shown in Fig. 9. Journaled beneath the type-cylinder $S'$ is an inking roller $I^3$ by which the types upon the cylinder are inked.

While I have shown and described a special knife or blade $T'$ for the fixed tearing edge, it is evident that the paper strip may be torn off against any suitable edge; or, if desired, a movable cutter may be employed for cutting the printed check from the strip, said cutter being actuated either by hand or automatically by the power of the machine, but inasmuch as the projecting end of the strip can be grasped and torn off as easily and quickly as a detached check could be picked up a movable cutter for severing the checks would not add to the utility of the machine.

Under the description heretofore given the power for actuating the feed-rollers at the return stroke of the operated key consists of the spring $F^3$ connected to the rear end of the rack $B^3$, and the gravity of the vibrating frame. These may be aided, if desired, by a resetting spring applied to the vibrating frame, as is common in this class of machines. In either case, however, the power for actuating the feed-rollers must be stored up by the positive stroke of the operated key, requiring a corresponding exertion of power in operating such key, and inasmuch as the actuation of the feed-rollers in the manner described adds considerable to the load of the machine the operation of the keys would ordinarily require a consequently unusual exertion of power. To relieve the keys of this extra duty, however, I have provided means for storing up power, to actuate the feed-rollers, by the closing of the money-drawer, said means consisting of a strong spring put under tension by the closing of the drawer, and devices intermediate said spring and the feed-rollers for causing it to exert its power upon them when the drawer is released and opened.

A spring such as that referred to has been illustrated and described in a pending application filed by me April 9, 1894, and bearing Serial No. 506,867. In that case it was employed simply as a resetting spring for the vibrating frame, and intended to insure the prompt resetting of said frame without loading the keys with the duty of lifting said frame against excessive gravity or the tension of a spring. In the present instance such spring operates through the vibrating frame and connections as an actuating spring for the feed-rollers and aids the spring $F^3$ before referred to. The application of this spring is illustrated in Fig. 11, where it will be seen that there is pivoted to the side-frame of the machine at $J^3$ the upper forward end of a curved arm $K^3$ whose lower end projects into the path of the rear wall of the money-drawer, preferably carrying an anti-friction roller $L^3$ bearing against the drawer. Connected to this arm $K^3$ near its lower end is the rear end of a strong coiled spring $M^3$ which is connected at its forward end to a front cross-bar of the framework. When the drawer is closed the engagement of its rear wall with the friction roller $L^3$ upon the lower end of the arm $K^3$ moves the latter to the position shown in the drawings, and while the drawer remains closed and locked the arm is maintained in that position. When, however, the drawer is released by the operation of any one of the keys the spring $M^3$ will draw the arm $K^3$ forward and downward. Now, the positive stroke of the operated key, before the drawer is released, will have lifted the vibrating frame until a stud $N^3$ projecting from its left hand side contacts with or is brought immediately adjacent the under side of the arm $K^3$, so that when the drawer is released and the arm pulled downward and forward by its spring the power of the latter will be exerted upon the vibrating frame and operate to aid the gravity of the latter in returning it to normal position. The vibrating frame is geared to the clutch-member which actuates one of the feed-rollers in the manner heretofore described, so that the power of the spring $M^3$ is utilized through the vibrating frame and connections to actuate said rollers.

In the absence of the spring put under tension by the closing of the drawer sufficient power may be applied to the operating keys to overcome the necessary gravity or put under tension the necessary spring or springs to reset the various parts of the machine and actuate the feed rollers. Nevertheless the duty of operating said rollers adds so materially to the load upon the keys that the employment of the special spring co-operating with the drawer and with the feed-rollers is highly advantageous in connection with my present invention.

Any suitable latch or locking device, controlled by the operating keys, for holding the money-drawer closed against the tension of the spring $M^3$, may be employed. In Fig. 12

I have illustrated a construction in which the latch consists of a lever $O^3$ pivoted at its front end in a slotted plate $P^3$ projecting upward from the top of the drawer-compartment and co-operating at its rear end with the rear wall of the money-drawer. This lever is provided with a vertically extending arm $Q^3$ passing through an opening in the vibrating frame G and whose upper end is curved rearward into position to be struck by said frame just as the latter reaches its limit of upward movement under the operation of any one of the keys. The rear end of the lever will thus be lifted out of engagement with the drawer at the end of the positive stroke of a key.

I am aware that it is not new to provide a cash register and indicator with a check-strip upon which the amount indicated and registered at each operation of the machine is printed, and with means for advancing said strip after the printing has been done and projecting its end from the machine into position for the printed check to be cut or torn from the strip—as shown, for instance, in my own prior patent heretofore referred to; but in none of the instances with which I am familiar has the machine been provided with means for printing the check and automatically delivering it from the machine by the mere ordinary registering and indicating operation of the keys, so that by simply operating any one or another of the keys in the usual manner the amount represented by such key will not only be indicated and registered, and printed upon a paper strip, but the end of that strip be automatically projected from the machine into position for the printed check to be grasped and torn off. So far as I am aware I am the first in the art to equip a machine of this character with means of any sort whatever giving it the capability of this mode of operation or enabling it to accomplish this result. In the complete machine which I have illustrated and described, when the clerk reaches forward and presses a key the machine not only puts forth to him its hand (the money-drawer) to receive the money from the sale, but it also hands him a printed receipt or check for it. The combined operations of indication, registration, recording, sounding the alarm, opening the cash-drawer, and printing and delivering the check are effected by the simple act of pressing down and releasing any one or another of the operating keys. All the operations of which the machine is capable are performed, and all the results which it can accomplish are accomplished, by the simple ordinary operation of any one of its keys. The printing and delivery of the check are automatic, or incidental to the indicating and registering operation of the keys, the keys performing all the duties they did in prior machines, and additional ones as well.

I am also aware that it is old to provide a cash register and indicator with a record strip upon which the amount of each indication and registration is printed by the operation of the keys, and that in some instances such record strip has been advanced from the printing point at or during the return negative strokes of the operated keys, as is the check strip in my machine; but in such prior machines the record strip referred to was contained entirely within the machine and never projected therefrom, being wound from one spool, across the printing point, to another spool. It was not visible from the outside of the machine, was never delivered therefrom, and never had a free end, either within reach or out of reach, which could be grasped and torn off for a check; and it was never cut or torn in two except when the reading was taken from the machine at the end of the day's business, and then it was removed from the spool and taken out of the machine, and a fresh supply put in its place, or the free end of the portion upon the supply spool re-connected to and wound upon the storage spool. Such a record strip does not correspond to my check strip in purpose or function, and the prior machines employing them did not have the mode of operation or accomplish the results of my machine.

Having thus fully described my invention, I claim—

1. The combination, with a series of operating keys representing different values, of a printing mechanism common to and actuated by them to print the value of the operated keys upon a single paper strip, and feeding devices also actuated by the keys to then advance the strip and project the printed check from the machine into position to be grasped and torn from the strip, substantially as described.

2. The combination of a series of operating keys representing different values, printing and feeding mechanisms common to and actuated in succession by them to print the value of any operated key upon a paper strip and then advance the strip from the printing point and project the printed check from the machine into position to be grasped, and a fixed bearing edge for severing the printed check from the strip, substantially as described.

3. The combination, with a series of operating keys representing different values, of a printing mechanism common to the keys and actuated by the positive stroke of any one of them to print its value upon a paper strip, and feeding devices, also common to the keys, operated at the return or negative stroke of such key to advance the strip and project the printed check from the machine into position to be severed from the strip, substantially as described.

4. The combination of a series of operating keys representing different values, a printing mechanism common to and actuated by the positive strokes of said keys to print the value of an operated key upon a paper strip, feeding devices also common to the keys and actuated at the return strokes thereof to advance the paper strip from the printing point and project the printed check from the machine, and a fixed tearing edge for severing the printed check from the strip, substantially as described.

5. The combination of a series of operating keys representing different values, a type-carrier and intermediate mechanism common to the keys for causing the positive stroke of any one of the keys to bring the corresponding number upon the type-carrier to the printing point, an impression platen common to and actuated by the keys and co-operating with the type-carrier to print said number upon a paper strip, and a pair of feed-rollers actuated at the return stroke of the key to advance the paper strip and project the printed check from the machine into position to be severed from the strip, substantially as described.

6. The combination of a series of operating keys representing different values, a type-carrier and intermediate means common to the keys for causing the positive stroke of any key to bring the corresponding number upon the type-carrier to the printing point, an impression platen actuated by the keys and co-operating with the type-carrier to print said number upon the paper strip, a pair of feed-rollers actuated at the return or negative stroke of the key to advance the strip from the printing point and project the printed check from the machine into position to be grasped, and a fixed tearing edge for severing the check from the strip, substantially as described.

7. The combination of a series of operating keys representing different values, a type-carrier provided with duplicate sets of numbers corresponding to the values of the keys, intermediate means common to the keys for causing the positive stroke of any key to bring the two corresponding numbers upon the type-carrier to two printing points, two impression platens actuated by the keys and co-operating with said type-numbers to print the value of the operated key upon a check-strip and a record-strip, and a pair of feed-rollers actuated at the return or negative stroke of the key to advance the check-strip and project the printed check from the machine into position for the check to be severed from the strip, substantially as described.

8. The combination of a series of operating keys representing different values, a type-carrier provided with duplicate sets of numbers corresponding to the values of the keys, intermediate means common to the keys for causing the positive stroke of any key to bring the two corresponding numbers upon the type-carrier to two printing points, two impression platens actuated by the keys and co-operating with said type-numbers to print the value of the operated key upon a check-strip and a record-strip, a pair of feed-rollers actuated at the return stroke of the key to advance the check-strip from the printing point and project the printed check from the machine in position to be grasped, and a fixed tearing edge for severing the printed check from said strip, substantially as described.

9. The combination of a series of operating keys representing different values, printing mechanism common to the keys and actuated by the positive stroke of any one of them to print its value upon a single paper strip, a vibrating frame common to said keys and moved by the operation of any one of them, and a pair of feed-rollers actuated by said vibrating frame during its return to normal position to advance the paper strip and project its end from the machine into position for the printed check to be grasped and severed from it, substantially as described.

10. The combination of a series of operating keys representing different values, a printing mechanism actuated by the positive stroke of any one of said keys to print its value upon a paper strip, a vibrating frame common to said keys and moved by the operation of any one of them, a pair of feed-rollers, a clutch-member turning with one of said rollers and a co-operating clutch-member geared to the vibrating frame, by which the feed-rollers are actuated during the return movement of the vibrating frame to advance the paper strip to position for the printed check to be severed therefrom, substantially as described.

11. The combination of a series of operating keys representing different values, a type-carrier and intermediate means common to the keys for causing the positive stroke of any key to bring the corresponding number upon the type-carrier to the printing point, a platen actuated by the keys and co-operating with the carrier to print the value of the key upon the paper strip, a pair of feed-rollers, a vibrating frame common to the keys, and means intermediate said frame and feed-rollers for causing the frame to actuate the rollers during its return movement only to advance the paper strip and project its end from the machine into position for the printed check to be severed from it, substantially as described.

12. The combination of a series of operating keys representing different values, a type-carrier and intermediate means for causing the positive stroke of any one of said keys to bring the corresponding number upon the type-carrier to the printing point, an impression platen co-operating with the carrier to print the value of said key upon the paper strip, a vibrating frame common to the keys and moved by the operation of any one of them, a pair of feed-rollers, a clutch-member turning with one of said rollers and a co-operating clutch-member geared to the vibrating frame and operating during the return movement of the latter to actuate the feed-rollers and advance the paper strip to position for the printed check to be severed from it, substantially as described.

13. The combination of a series of operating keys representing different values, a type-carrier and intermediate means for causing the positive stroke of any one of the keys to bring the corresponding number upon the type-carrier to the printing point, a platen co-operating with the carrier to print the value of the key upon a paper strip, a pair of feed-rollers for advancing said strip, a vibrating frame common to the keys and moved by the operation of any one of them, a reciprocating segment actuated by said frame, a pinion meshing with the segment, a clutch-member turning with the pinion and a co-operating clutch-member turning with one of the feed-rollers, substantially as and for the purpose described.

14. The combination of a series of operating keys representing different values, a type-carrier and intermediate means common to the keys for causing the positive stroke of any one of said keys to bring the corresponding number upon the type-carrier to the printing point, a platen actuated by the keys and co-operating with the carrier to print the value of the key upon a paper-strip, a pair of feed-rollers for advancing the strip, a vibrating frame common to the keys and moved by the operation of any one of them, means intermediate said frame and the feed-rollers for causing the frame to actuate said rollers during its return movement only, to advance the paper strip from the printing point and project the printed check from the machine, and a fixed tearing edge for severing the printed check from the strip, substantially as described.

15. The combination of a series of operating keys representing different values, a printing mechanism common to the keys and actuated at the positive stroke of any one of them to print the value thereof upon a paper strip, and a pair of feed-rollers actuated by the keys only at the return stroke thereof to advance the printed check and project it from the machine into position to be severed from the strip, said rollers consisting of a type-cylinder and an impression-roller operating to consecutively number and date the checks, substantially as described.

16. The combination of a series of operating keys representing different values, a printing mechanism common to the keys and actuated at the positive stroke of any one of them to print the value thereof upon a paper strip, a pair of feed-rollers actuated by the keys at the return stroke thereof to advance the printed check to position to be severed from the strip, said rollers consisting of a type-cylinder and an impression-roller operating to consecutively number and date the checks, and a fixed tearing edge for severing the printed check from the strip, substantially as described.

17. The combination of a series of operating keys representing different values, a movable frame common to and actuated thereby and given different degrees of movement by the different keys proportionate to the respective values thereof, a type-carrier geared to said frame and moving at the positive stroke of a key to bring to the printing point the number corresponding to such key, a platen actuated by the keys and co-operating with the type-carrier to print the value of the operated key upon a paper strip, a pair of feed-rollers for advancing the strip to position for the printed check to be severed from it, a vibrating frame common to the keys and given the same degree of movement by the operation of any one of them, and means intermediate said frame and one of the feed-rollers for causing the frame to actuate the rollers only at its return movement, substantially as and for the purpose described.

18. The combination of a series of operating keys representing different values, a movable frame common to and actuated thereby and given different degrees of movement by the different keys proportionate to their respective values, means for automatically coupling the keys to the frame at the beginning of its movement to prevent overthrow of it, a type-carrier geared to the frame and moving at the positive stroke of any one of the keys to bring the corresponding number to the printing point, a platen actuated by the keys and co-operating with the carrier at the end of the positive stroke of the key to print the value thereof upon a paper strip, a pair of feed-rollers for advancing the paper strip to position for the printed check to be severed from it, a vibrating frame common to the keys and moved to the same extent by the operation of any one of them, and means intermediate said frame and one of the feed-rollers for causing the frame to actuate the rollers during its return movement only, substantially as and for the purpose described.

19. In a cash register and check printer, the combination of a series of operating keys representing different values, a movable frame common to and actuated thereby and given different degrees of movement by the different keys proportionate to their respective values, a register actuated by said frame to register the values of the operated keys, a type-carrier geared to said frame and moving at the positive stroke of a key to bring its corresponding number to the printing point, a platen actuated by the keys and co-operating with the carrier at the end of the positive stroke of the key to print the value of the latter upon the paper strip, and a pair of feed-rollers actuated only at the return stroke of the key to advance the paper strip to position for the printed check to be severed from it, substantially as described.

20. In a cash register and check printer, the combination of a series of operating keys representing different values, a movable frame common to and actuated thereby and given different degrees of movement by the different keys proportionate to their respective values, a register actuated by said frame to register the values of the operated keys, a type-carrier geared to said frame and moving at the positive stroke of a key to bring its corresponding number to the printing point, a platen actuated by the keys and co-operating therewith at the end of the positive stroke of the key to print the value of the latter upon a paper strip, a pair of feed-rollers actuated at the return stroke only of the key to advance the paper strip from the printing point, and a fixed tearing edge for severing the printed check from the strip, substantially as described.

21. In a cash register and check-printer, the combination of a series of operating keys representing different values, a movable frame common to and actuated by the keys and given different degrees of movement by the different keys proportionate to their respective values, a register actuated by said frame to register the values of the operated keys, a type-carrier geared to said frame and moving at the positive stroke of a key to bring its corresponding number to the printing point, a platen actuated by the keys and co-operating with the carrier at the end of the positive stroke of the key to print the value of the latter upon the paper strip, and a pair of feed-rollers actuated at the return stroke only of the key to advance the paper strip to position for the printed check to be severed from it, said feed-rollers consisting of a type-cylinder and impression-roller operating to consecutively number and date the checks, substantially as described.

22. In a check-printing machine having a money-drawer, the combination of a series of operating keys representing different values, a printing mechanism actuated by the operation of any one of said keys to print its value upon a paper strip, feeding devices for advancing the strip after the printing has been done, a spring put under tension by the movement of the drawer in one direction, and means intermediate said spring and the feeding devices for actuating the latter to advance the paper strip when the drawer is released and moved in the opposite direction, substantially as described.

23. In a check-printing machine having a money-drawer, the combination of a series of operating keys representing different values, a printing mechanism actuated by the operation of any one of said keys to print its value upon a paper strip, feeding devices for advancing the strip after the printing has been done, a spring put under tension by the closing of the drawer, and means intermediate said spring and the feeding devices for actuating the latter to advance the paper strip at the opening of the drawer, substantially as described.

24. In a check-printing machine, the combination of a series of operating keys representing different values, a money-drawer, a latch controlled by said keys for holding the drawer closed, a printing mechanism actuated by the operation of any one of said keys to print its value upon a paper strip, feeding devices for advancing the strip after the printing has been done, a spring put under tension by the closing of the drawer, and means intermediate said spring and the feeding devices for actuating the latter to advance the paper strip when the drawer is released by the operation of a key, substantially as described.

25. In a check-printing machine, the combination of a series of operating keys representing different values, a money-drawer, a latch controlled by said keys for holding the same closed, a type-carrier and means intermediate the same and operating keys for causing the positive stroke of any one of said keys to turn the carrier to position to print its value upon a paper strip, a platen co-operating with the type-carrier, a pair of feed-rollers for advancing the strip after the printing has been done, a spring put under tension by the closing of the drawer, and means intermediate said spring and the feed-rollers for actuating the latter to advance the strip when the drawer is released by the operation of a key, substantially as described.

26. In a check-printing machine having a money-drawer, the combination of a series of operating keys representing different values, a printing mechanism actuated by the operations of said keys to print their values upon a paper strip, feeding devices for advancing the strip after the printing has been done, a movable member common to the keys and moved by the operation of any one of them, a re-setting spring for said member put under tension by movement of the drawer, and means intermediate said member and the feeding devices for actuating the latter, substantially as described.

27. In a check-printing machine, the combination of a series of operating keys, a money-drawer, a latch controlled by the keys for holding the drawer closed, a printing mechanism actuated by the keys to print their values upon a paper strip, feeding devices for advancing the strip after the printing has been done, a movable member common to the keys and moved by the operation of any one of them, a re-setting spring for said member put under tension by the closing movement of the money-drawer, and means intermediate said member and the feeding devices for actuating the latter at the re-setting movement of the member, substantially as described.

28. In a check-printing machine, the combination of a series of operating keys, a money-drawer, a latch controlled by the keys for holding the drawer closed, a printing mechanism actuated by the keys to print their values upon a paper strip, a pair of feed rollers for advancing the strip after the printing has been done, a movable member common to the keys and moved by the operation of any one of them, a re-setting spring for said member put under tension by the closing movement of the drawer, and means intermediate said member and the feed-rollers for causing the latter to be turned to advance the paper strip at the re-setting movement of said member, substantially as described.

29. In a check-printing machine, the combination of a series of operating keys, a money-drawer, a latch controlled by the keys for holding the drawer closed, a printing mechanism actuated by the keys to print their values upon a paper strip, a pair of feed-rollers for advancing the paper strip after the printing has been done, a movable member common to the keys and moved by the operation of any one of them, a re-setting spring for said member put under tension by the closing of the drawer, an oscillatory member actuated by said movable member, and a clutch connection between said oscillatory member and one of the feed-rollers for causing the latter to be turned by the movable member at its re-setting movement only, substantially as described.

30. In a check-printing machine, the combination of a series of operating keys representing different values, a money-drawer, a latch controlled by said keys for holding the same closed, a type-carrier and means intermediate the same and operating keys for causing the positive stroke of any one of said keys to turn the carrier to position to print its value upon a paper strip, a platen co-operating with the type-carrier, a pair of feed-rollers for advancing the strip after the printing has been done, a vibrating frame moved by the operation of any one of the keys, a clutch-member geared to said frame, a co-operating clutch-member turning with one of the feed-rollers, to cause the latter to be actuated by the return movement of the vibrating frame, and a resetting spring for said frame put under tension by the closing of the money-drawer and exerting its force upon said frame when the drawer is released by the operation of a key, substantially as described.

31. The combination of a series of operating keys representing different values, a type-carrier and intermediate means for moving it to different positions by the operations of different keys, to print their respective values, an impression platen co-operating with the carrier, an inking ribbon led between the platen and carrier, and a vibrating inking pad actuated by the keys and operating to contact with and ink the ribbon at each operation of the machine, substantially as described.

32. The combination of a series of operating keys representing different values, a type-carrier and intermediate means for moving it to different positions by the operations of the different keys, to print their respective values, a vibrating impression platen actuated by the keys and co-operating with the carrier, an inking ribbon led between the carrier and platen, and a vibrating inking pad moving with the impression platen and contacting with the inking ribbon at each operation for the purpose described.

THOMAS CARNEY.

Witnesses:
EDWARD RECTOR,
R. B. CAFFRAY.